United States Patent [19]
Wurzburger

[11] 3,814,378
[45] June 4, 1974

[54] PRESSURE-BALANCED PLUG VALVE

[76] Inventor: Paul D. Wurzburger, 3255 E. Monmouth Rd., Cleveland Heights, Ohio 44118

[22] Filed: Dec. 4, 1972

[21] Appl. No.: 311,846

[52] U.S. Cl. .............................. 251/283, 251/312
[51] Int. Cl. ............................................ F16k 39/00
[58] Field of Search ........... 251/283, 309, 310, 311, 251/312; 137/625.41, 625.47

[56] References Cited
UNITED STATES PATENTS

| 992,332 | 5/1911 | Brion et al. | 137/625.41 X |
| 1,783,441 | 12/1930 | Lewis | 251/283 |
| 3,134,403 | 5/1964 | Rudelick | 137/625.47 X |
| 3,430,919 | 3/1969 | Frazier | 251/283 |

FOREIGN PATENTS OR APPLICATIONS

| 207,391 | 2/1940 | Switzerland | 251/309 |

Primary Examiner—William R. Cline
Assistant Examiner—Ira S. Lazarus
Attorney, Agent, or Firm—Bosworth, Sessions & McCoy

[57] ABSTRACT

A rotary plug valve comprising a valve body having a cylindrical bore with axially offset lateral inlet and outlet ports communicating with the bore on opposite sides thereof. A cylindrical plug in the bore has a slanted passage which connects the inlet port to the outlet port in the open position of the valve. Sealing means are provided at each end of the plug. Flow sealing means is provided on the periphery of the plug between the end sealing means and follows a continuous sinuous path around the plug having peaks which extend alternately above and below the inlet port. The path lies between the inlet and outlet ports in the closed position of the valve to prevent leakage therebetween. Substantially identical increments of the path are diametrically spaced apart and encompass equal areas on opposite sides of the plug. The plug is thereby balanced under all operating conditions against forces created by the fluid pressure acting thereon.

21 Claims, 9 Drawing Figures

PRESSURE-BALANCED PLUG VALVE

BACKGROUND OF THE INVENTION

This invention relates to rotary plug valves intended for use in high pressure fluid circuits and more particularly to an improved valve structure of that type which includes flow sealing means between the plug and the bore for preventing leakage between inlet and outlet in the closed position of the valve and so arranged as to cause the hydraulic or pneumatic forces on the plug to be balanced under all operating conditions of the valve.

A typical rotary plug valve includes a valve body having a bore formed therein and inlet and outlet ports leading to and from the bore. A plug is arranged in the bore so as to be rotatable between a closed position in which the inlet and outlet ports are sealed off from one another and an open position in which the ports are placed in communication through a passage or the like in the plug. The plug and the bore are generally either tapered or cylindrical. Sealing means are usually provided to prevent leakage in the clearance between the plug and the bore from the inlet to the outlet port in the closed position of the valve. Typical sealing means is an elastomeric ring seated in a groove in the periphery of the plug.

A problem associated with cylindrical plug valves subjected to high fluid working pressures (above about 300 psi for a plug diameter of about ½ inch or greater) is the high torque required to operate them. This is due to the high frictional forces which are generated between a surface of the plug and the mating surface of the valve body by lateral shifting or tipping of the plug in response to high fluid pressures acting thereon. The greatest shifting or tipping and highest frictional forces usually occur in the closed position of the valve when the plug is subjected to the full line pressure and its downstream side is forced against the mating surface of the valve body. In the open position fluid can be trapped in the valve in such a manner as to shift the plug against the wall of the bore and make it very difficult to close the valve. Actually, under essentially any operating conditions of the valve pressure differences can occur from inlet to outlet or outlet to inlet caused by such things as disturbances in the external hydraulic or pneumatic circuit. Unless the plug is balanced it will be forced against the mating surface of the valve body and render the valve very difficult to operate.

The problems described above are the results of the pressure differentials existing between the inlet and outlet ports of the valve. Efforts have been made to balance the forces acting on a valve plug due to the high working pressures to which it is subjected. Usually, some means is provided for distributing fluid pressure on both the upstream and downstream sides of the plug so that the pressure is equal on both sides. In these cases, however, no provision is made for ensuring that fluid pressure acts upon substantially equal areas on opposite sides of the plug and the plug remains unbalanced for that reason. Even in cases where some effort is made to equalize areas on opposite sides of the plug the equal area condition prevails only for one operating condition of the plug, such as for a pressure difference from inlet to outlet in the closed position of the valve. Should the pressure at the outlet side of the plug ever exceed that at the inlet the plug is shifted against the wall of the bore at the inlet side of the valve and becomes very difficult to rotate. Another failing of such past efforts is in the complexity of the arrangements for distributing fluid to the outlet side of the plug and for defining equal plug areas upon which it is to act. An example of an effort of this type is disclosed in U.S. Pat. No. 3,430,919 to B. J. Frazier.

Another problem with high pressure plug valves which employ elastomeric sealing rings such as O-rings is that the O-rings may be damaged when the valve is operated. In particular, a portion of the O-ring passing across the outlet port when the valve is operated may be distended by fluid pressure into the port and may be pinched between the plug and the peripheral edge of the port.

SUMMARY OF THE INVENTION

A general object of this invention is to provide a rotary plug valve for use in high pressure service which overcomes the difficulties described above encountered with prior rotary plug valves. A particular object is to provide such a rotary plug valve in which the torque required to operate the valve is much lower than in prior valves of the same general type.

Another object of this invention is to provide such a rotary plug valve in which the forces created by fluid pressure acting upon the plug are balanced under all conditions of operation.

Still another object is to provide such a rotary plug valve having elastomeric flow sealing means for preventing leakage of fluid between the inlet and outlet ports in the closed position of the valve in which the sealing means follows a path such that substantially equal areas are defined on opposite sides of the plug.

Yet another object is to provide such a rotary plug valve in which the path of the elastomeric flow sealing means is such that it cannot be pinched during operation of the valve.

Still another object of this invention is to provide such a rotary plug valve that is simple in construction and effective and reliable in use.

These and other objects of the present invention are attained by the provision of a rotary plug valve including a valve body having a bore with a lateral inlet port and a lateral outlet port communicating with the bore on opposite sides thereof. The outlet port is offset from the inlet port axially of the bore. A plug is provided in the bore having a slanted passage, the ends of which register and communicate with the inlet and outlet ports, respectively, when the valve is in the open position. Flow sealing means are provided between the bore and the plug which follows a continuous sinuous path having peaks extending alternately in oppposite axial directions. Substantially identical increments of the path are diametrically spaced apart. The inlet and outlet ports lie on opposite sides of the path in the closed position of the valve.

DESCRIPTION OF THE PREFERRED EMBODIMENTS

Referring initially to FIGS. 1 to 5, a first form of valve embodying the present invention includes a valve body 10 having an axially extending cylindrical bore 12 open at both ends. A plug 14 is seated in the bore. A lateral inlet port 15 and a lateral outlet port 16 communicate with the bore 12 on opposite sides thereof. Ports 15, 16 are axially offset for reasons that will appear below. Ports 15, 16 communicate at their ends opposite bore 12 with inlet and outlet connections which, in the form illustrated, are threaded sockets 18, 19. The top part of the valve body 10 is cylindrical and has an arcuate slot 23 in its outer wall. Slot 23 extends through substantially 90° and defines an operating path and guideway for a plug operating handle. The plug operating handle also serves as a plug retaining and removing means as described below. Recesses 26, 27 are provided in the wall of bore 12 adjacent its top and bottom ends and wiper rings 29, 30 are seated therein to bear resiliently against the periphery of plug 14 and prevent contaminants such as dirt and the like from entering the valve. A passage 32 is provided in the valve body between the inlet socket 18 and bore 12 which serves a purpose described below.

Figure 2:
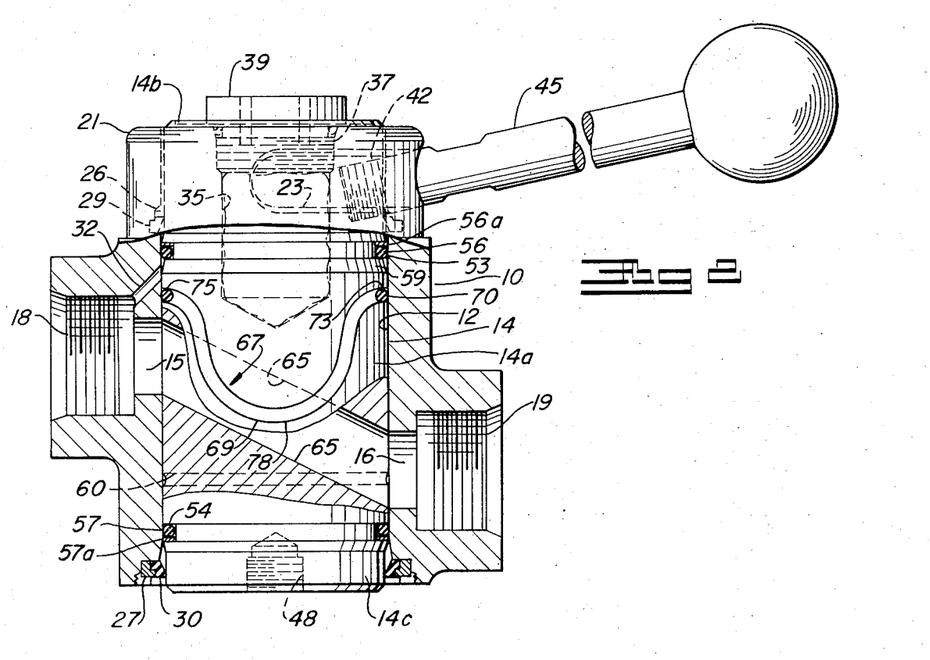
FIG. 2 is a view similar to FIG. 1 with the valve shown in the open position.

Plug 14 has an axially central sealing portion 14a which has a close fit with bore 12 and has an upper portion 14b and a lower portion 14c which are reduced very slightly in diameter from sealing portion 14a. The upper portion 14b is provided with an axially extending opening 35 having threads 37 at its open end. A plug 39 is threaded into opening 35 to close it. The opening 35 serves as a convenient and readily accessible storage compartment for spare valve parts such as sealing rings as described in my copending U.S. Pat. application Ser. No. 311,845 filed concurrently with this application and entitled "Plug Valve With Storage Compartment." The upper portion 14b of the plug also has a tapped hole 42 in its cylindrical surface inclined upwardly at a slight angle toward the periphery of the plug as shown in FIG. 2. A combined plug operating handle, plug retaining means and plug removing means 45 extends through slot 23 in the cylindrical portion 21 of the valve body and into threaded engagement in hole 42. Operating handle 45 can be rotated through the limits defined by slot 23 to rotate plug 14 from one to the other of the open and closed positions of the valve.

The lower portion 14c of the plug is provided with an axially extending tapped hole 48. The threads of hole 48 and those of operating handle 45 are matched so that the operating handle can be threaded into hole 48 to assist in unseating and removing the plug 14 from the bore when that is desired.

The limits of the sealing portion 14a of plug 14 are defined by annular grooves 53, 54 in the plug in which are seated O-ring seals 56 and 57 and conventional back-up rings 56a and 57a. These O-rings provide a seal between the plug and the bore to prevent leakage of fluid from either open end of the valve. Located axially inwardly of the respective end O-rings 56 and 57 are pressure distributing grooves 59, 60 which ensure that controlled fluid and its pressure is distributed completely about the periphery of plug 14. Normally, there will be sufficient clearance between plug 14 and bore 12 to permit fluid to distribute itself in the clearance. Grooves 59 and 60, however, facilitate and add to such distribution. The passage 32 between inlet socket 18 and bore 12 opens in the bore in substantial alignment with distributing groove 59 to permit the passage of fluid directly thereto. From the groove the fluid can flow axially downwardly in the clearance between plug and bore. The lower distributing groove 60 is positioned to intersect lateral outlet port 16 and no passage is necessary to ensure that fluid is provided to the groove.

A slanted passage 65 extends through the sealing portion 14a of the plug with its central axis intersecting the longitudinal axis of plug 14. The upper end of passage 65 is at the same axial height as inlet port 15 and the lower end of passage 65 is at the same axial height as outlet port 16. In the open position of the valve shown in FIG. 2 passage 65 connects inlet port 15 with outlet port 16. In the closed position of the valve passage 65 is substantially at right angles to inlet port 15 and outlet port 16.

Flow sealing means generally indicated at 67 is provided between plug 14 and bore 12 to prevent leakage of fluid between the inlet and outlet ports in the closed position of the valve. Flow sealing means 67 follows a sinuous path having peaks, sometimes also called peaks and troughs, that extend alternately above and below one of the ports 15, 16, preferably inlet port 15. Corresponding increments of like waves of the sinuous path lie diametrically opposite each other. As a result, the path defines equal areas between itself and each of the end sealing O-rings 56, 57 at diametrically opposite portions of the plug surface. The areas on the upstream and downstream sides of the plug that can be acted upon by fluid pressure are thus equalized and the forces acting on the plug will be balanced. The axially acting forces of inlet fluid pressure exerted on seals 67 and 56 are equal and opposite as are the similarly related axial forces of outlet fluid pressure exerted on seals 67 and 57. No unbalanced axial force is exerted on the plug. The path of the flow sealing means in the closed position of the valve is between the inlet port and the outlet port to prevent leakage therebetween.

The flow sealing means may be carried by and moved with the plug or may be provided in the wall of the bore and remain stationary as the plug moves with respect to the bore. In the former case the slanted passage 65 in the plug will be on the same side of the flow sealing means in both the open and closed position of the valve. The inlet and outlet ports 15 and 16 will be on the same side of the flow sealing means in the open position of the valve but will be on opposite sides of the flow sealing means in the closed position. In the latter case the inlet and outlet ports will be on opposite sides of the flow sealing means in both the open and closed positions of the valve. The ends of the plug passage will be on the same side of the flow sealing means in the closed position of the valve but will be on opposite sides in the open position.

Preferably, the flow sealing means is carried by the plug 14 in the form of an O-ring seated in a sinuous annular groove 69 which completes two full repetitive cycles about the periphery of the plug. The sinuous path of the groove 69 and O-ring 70 and its effect can be seen most clearly in FIG. 4 in which the plug 14 has been "unrolled" to illustrate the full length of the groove. It will be seen that the path comprises one full cycle from the peak 73 to the peak 75 and a second cycle from peak 75 to peak 73' which actually is peak 73 when the plug is again rolled into a cylinder. The peak 73, 73' is diametrically opposite peak 75 and the downwardly extending troughs 77 and 78 are diametrically opposite each other. The area between the sinuous path 69-70 and end annular groove 53 from peak 73 to peak 75 is substantially equal to the corresponding area from peak 75 to peak 73'. Likewise, increments of these areas between corresponding points of the two cycles are also equal.

Figure 4:
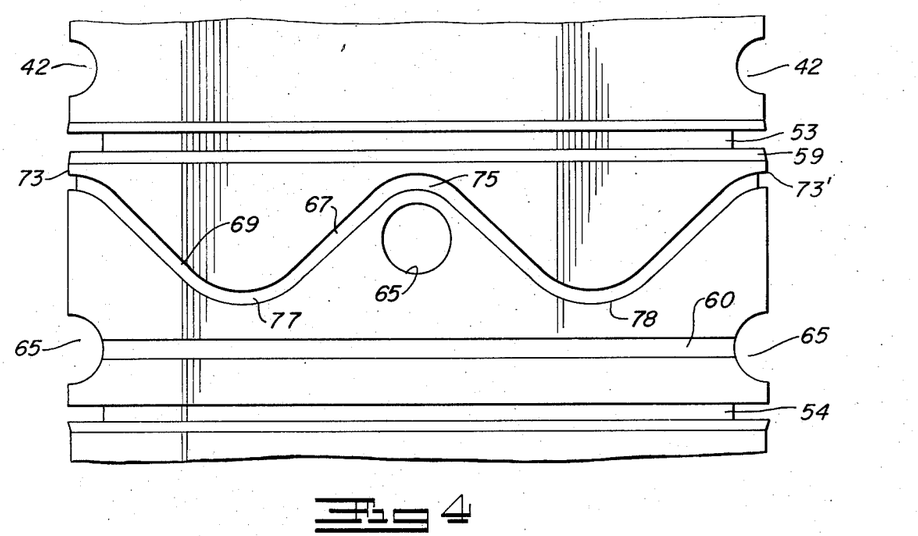
FIG. 4 is a side elevational view of a portion of the plug of the valve of FIG. 1, the cylindrical surface of the plug being "unrolled" and projected onto a plane.

It will be apparent also that substantially the same result will be obtained so long as the number of cycles or waves of the path occurring between peaks 73 and 75 is the same as the number occurring between peaks 75 and 73'. It will be apparent also that the path need not be smoothly sinuous as shown but may be somewhat rectangular or have other symmetrical shapes so long as the areas over or under similar portions of the path that are diametrically opposite each other are equal, and devoid of deleterious effects on the O-ring. In this regard it will be apparent that the shape of peaks 75 and 73, 73' need not correspond to that of troughs 77 and 78 since these portions of the path are not diametrically opposite each other. For example, the peaks 75 and 73, 73' could be rounded as shown while the troughs 77 and 78 could be flattened.

Figure 1:
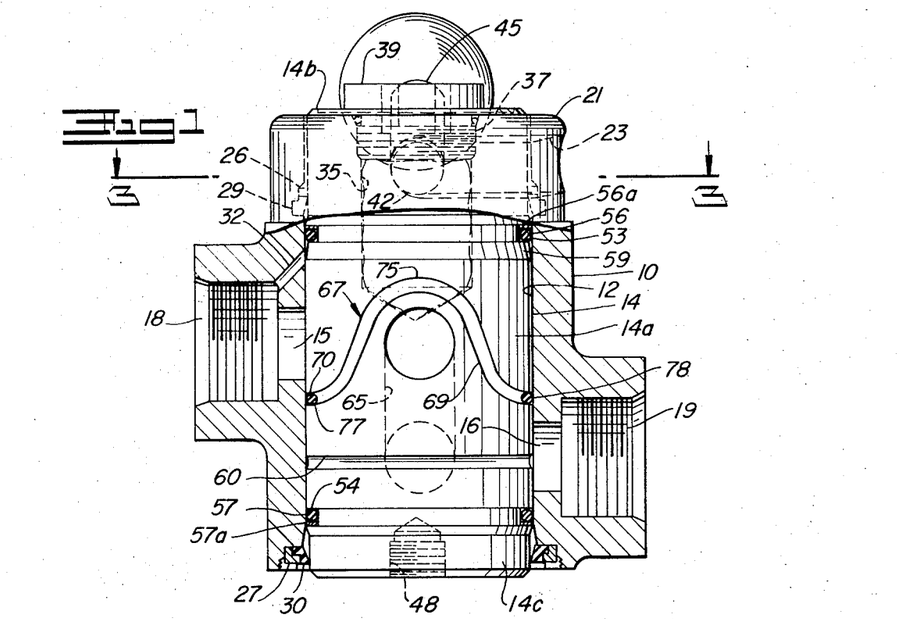
FIG. 1 is a side elevational view, partly in section, of a valve embodying the present invention, the valve being shown in the closed position.

As shown in FIGS. 1 and 2 the vertical distance between peak 75 and trough 77 is greater than the diameter of inlet port 15. Consequently, in the closed position of the valve trough 77 is positioned below port 15, while in the open position of the valve peak 75 is positioned above the inlet port. Both trough 78 and peak 70 are positioned, in the closed and open positions of the valve, respectively, above outlet port 16.

Figure 5:
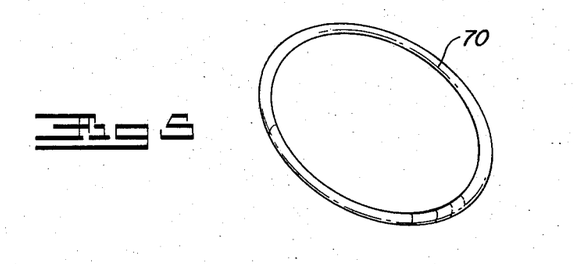
FIG. 5 is a perspective view of the O-ring flow sealing means of the valve of FIG. 1.

As shown in FIG. 5, flow sealing ring 70 need have no special configuration nor cross sectional shape but can merely be a conventional O-ring of a standard size to fit within groove 69. The circumferential length of the O-ring when unextended may correspond to the length of the sinuous groove 69 whether the groove is provided in the wall of the bore 12 or in the surface of plug 14. When the sinuous groove is on the surface of plug 14, however, it appears advantageous to have the length of the O-ring when unextended less than the length of the groove so that the O-ring is under tension in the groove. This provides a tighter fit of the O-ring in groove 69 which appears to assist in retaining the O-ring in the groove when it is most subject to being dislodged by fluid pressure as in moving the plug from one to the other of the open and closed positions of the valve. Sealing rings having other cross-sectional shapes may be used in place of O-ring 70.

Operation of the valve of FIGS. 1 to 5 will be readily understood from the foregoing description. In the open position of the valve shown in FIG. 2 the plug is positioned so that the ends of slanted passage 65 register and communicate with inlet port 15 and outlet port 16, respectively. The inlet and outlet ports and both ends of the slanted passage 65 lie on the same side of the sealing means 67. A flow path is thus provided through the valve with very little pressure drop across it.

Figure 3:
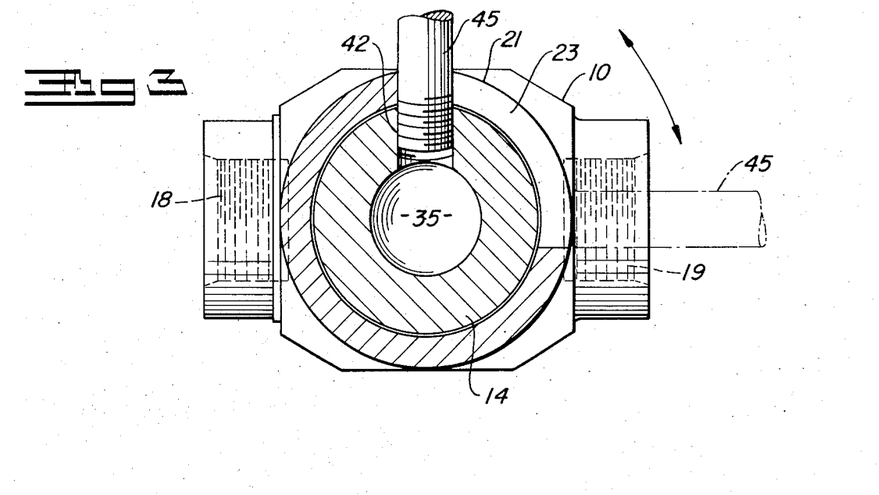
FIG. 3 is a horizontal sectional view of the valve on the line 3—3 of FIG. 1.

To close the valve, operating handle 45 is rotated through 90° from the dashed line position shown in FIG. 3 to the full line position. Plug 14 is thereby positioned as shown in FIG. 1. In rotating the plug the curved portion of O-ring 70 between peak 75 and trough 77 passes across inlet port 15. In so doing the O-ring is subjected to fluid pressure and velocity but a component of the pressure acts in a direction to hold the O-ring seated in the groove. Also, the tension of the O-ring resulting from its extended condition tends to retain it properly seated in the groove.

The portion of O-ring 70 between peak 73 and trough 78, on the other hand, is always above outlet port 16 and does not pass across it. This portion of the O-ring is, therefore, never in a position such that it can be distended by a fluid pressure differential into the outlet port and pinched at the edge of the port.

In the closed position of the valve shown in FIG. 1, fluid at inlet port 15 is conducted around the periphery of the plug through the clearance between the plug and bore and distributes itself completely about the plug between O-ring seals 56 and 70, assisted by the distributing groove 59 as described above. The pressure of the fluid so distributed is exerted in all directions. Since the areas acted upon at diametrically opposite portions of the plug are equal, the pressure is exerted upon substantially equal areas and there is no unbalanced force tending to press the plug against the downstream wall of the bore. On the downstream side bounded by O-ring 70 and 57 the pressure is much less than on the inlet side, atmospheric, for example, and again the pressure is distributed completely about the periphery of plug 14 and acts upon equal areas of the plug so that there is substantially no pressure difference on diametrically opposite portions of the plug. The distribution of the pressure over diametrically opposite equal areas of the plug also prevents the occurrence of any unbalanced moments tending to tip the plug and press it against the wall of the bore at top and bottom.

When the plug is rotated from the closed to the open position the portion of the O-ring between peak 77 and trough 75 is again passed across inlet port 15 while the portion between peak 73 and trough 78 remains above outlet port 16. Again there is no opportunity for the O-ring to be pinched adjacent the outlet port and substantially none for it to be pinched adjacent the inlet port because of the tension in the O-ring as well as its being held seated in the groove by fluid pressure. Experience has shown that it is not, in fact, pinched or otherwise damaged but remains sound for many on-off operations.

It should be noted also that the valve can be operated so that port 16 is the inlet port and port 15 is the outlet port. In such case, the valve has essentially the same advantages described above including the plug being balanced against lateral shifting and against tipping. The portion of O-ring 70 between trough 77 and peak 75 is, however, subjected to fluid pressure differentials tending to distend it into the port 15 as it passes over the port. Experience again teaches, however, that the O-ring is not pinched as it is passed across the port 15. Again, this is presently believed to be due to the tension in the O-ring which tends to retain it seated in the groove.

As mentioned above, when the valve is in service, situations can arise which produce pressure differentials across the valve from outlet to inlet. Because of the symmetrical arrangement of the flow sealing O-ring 70 with respect to a plane containing the vertical axis of the plug, however, the plug is balanced for essentially all operating conditions and will not be shifted or tipped by such pressure reversals.

Since the plug 14 is of constant diameter through its length there is no projected area of the plug to be acted upon axially by fluid pressure as exists in a tapered plug. Plug 14 is thus balanced axially as well as radially.

It will be noted that the valve body 10 is open at both ends and that the plug 14 extends outwardly a slight distance from each end. No cap, plug or similar means is provided at either end of the valve body to support and retain the plug therein. In place of an end cap or the like the plug is retained in the bore by operating handle 45. As shown in FIG. 3 the end of operating handle 45 extends through slot 23 in the valve body and into threaded engagement with the tapped hole 42. The operating handle is free to move in a radial plane within the limits defined by the guide slot 23 but has essentially no freedom of movement axially of the valve body. The plug is thus retained in position in the valve body by the operating handle and its contact with the edge of slot 23. With the valve in the open or closed position the load supported by the operating handle does not exceed the weight of the plug since essentially no axial hydraulic or pneumatic forces act upon the plug. The contact of operating handle 45 with the edge of slot 23 also prevents axial displacement of the plug during opening and closing when an axial force could be exerted on the plug in the course of actuating it. Operating handle 45 as combined plug operating, retaining and removal means is described in my copending U.S. Pat. application Ser. No. 311,844 filed concurrently with this application and entitled "Plug Valve With Combined Plug Operating, Retaining And Removal Means."

The valve embodying the present invention can be used with advantage at working fluid pressures of a few hundred psi but is particularly advantageous at working fluid pressures in the order of about 5,000 psi for a plug of nominally ¾ inch diameter and up to about 10,000 psi for plugs of smaller diameter.

Valve body 10 may be made of suitable metal such as steel or aluminum alloy, steel being preferred for high pressure service. Plug 14 also can be of any suitable material but is preferably an aluminum alloy when the valve body is made of steel as the dissimilar metals will have a minimum tendency to seize. The end O-rings 56 and 57 and flow sealing O-ring 70 are preferably made of the material sold under the trademark Viton, the end O-rings being preferably 70 durometer while O-ring 70 is preferably 90 durometer. The backup rings 56a and 57a are made of Teflon (a registered trademark) and the wiper rings 29 and 30 are preferably Viton, 90 durometer.

Figure 6:
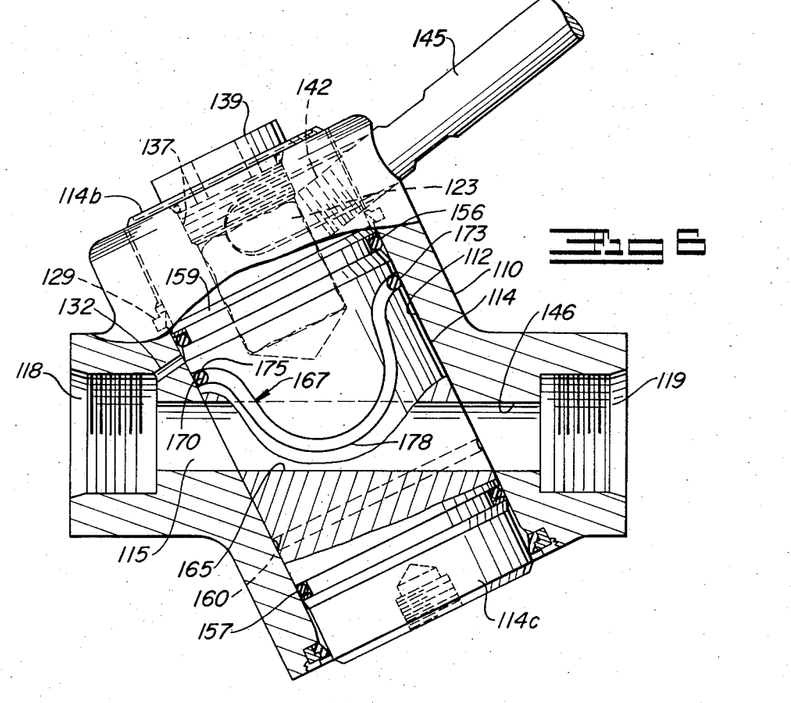
FIG. 6 is a side elevational view partly in section of another form of valve embodying the present invention, the valve being shown in the open position.
Figure 7:
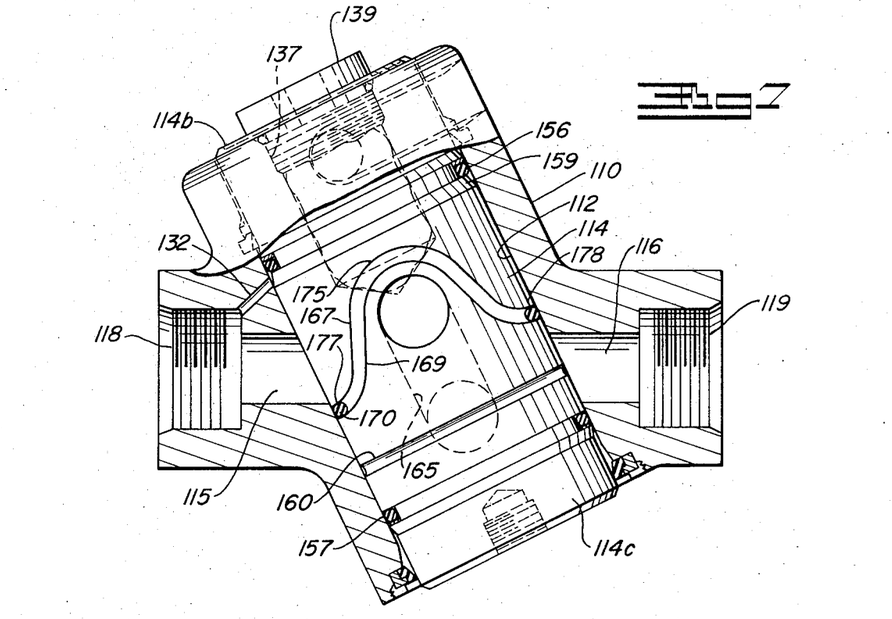
FIG. 7 is a view similar to FIG. 6 of the valve of FIG. 6 in the closed position.

FIGS. 6 to 9 illustrate other forms and variations of the basic valve of FIGS. 1 and 2 embodying the present invention. In FIGS. 6 and 7 parts of the valve corresponding to those in FIGS. 1 to 5 are identified by the same reference numerals preceded by a "1" such as plug 114. The illustrated valve has the axes of the inlet and outlet sockets 118, 119 and the inlet and outlet ports 115, 116 inclined with respect to the axis of the valve so that the slanted passage 165 in the plug and the inlet and outlet ports 115, 116 are aligned and are horizontal with the valve in the position illustrated. In all other respects the valve is substantially the same as the form illustrated in FIGS. 1 to 5. The valve of FIGS. 6 and 7 is useful in areas where space requirements are such that the inlet socket 118 and outlet socket 119 must be in substantial horizontal alignment. The inlet and outlet ports are offset angularly but are aligned on the same horizontal axis. The alignment of the axes of inlet and outlet ports 115, 116 with the axis of slanted passage 165 also provides a straighter flow path through the valve and slightly less obstruction to flow.

Figure 8:
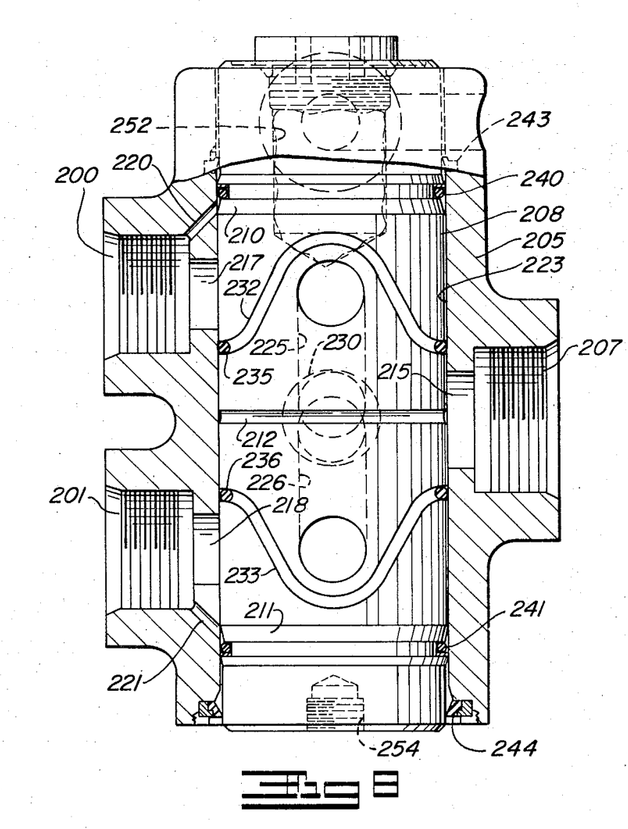
FIG. 8 is a side elevational view, partly in section, of a mixing valve embodying the present invention, the valve being shown in the closed position.
Figure 9:
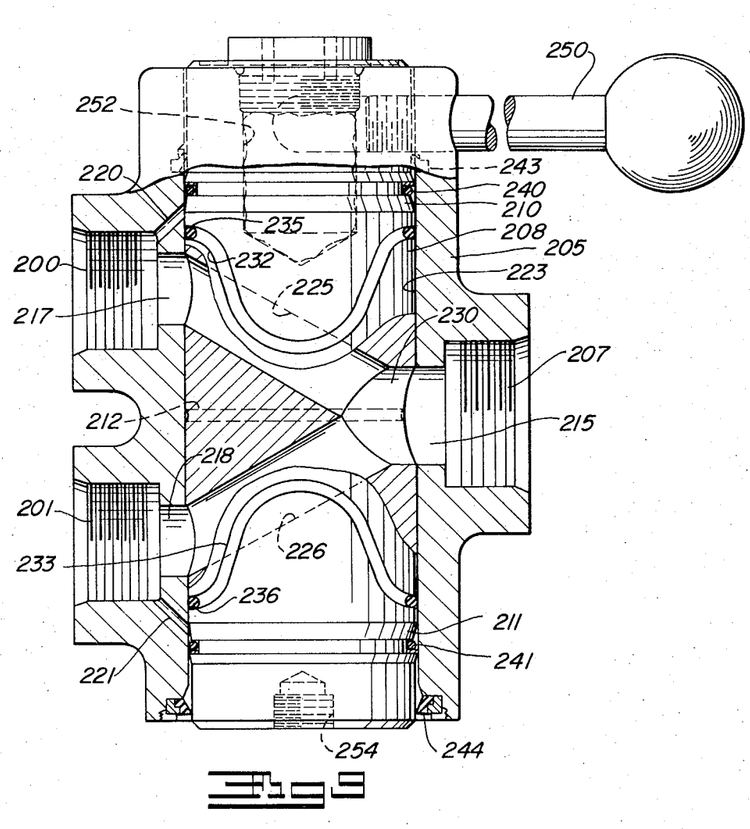
FIG. 9 is a view similar to FIG. 8 of the valve of FIG. 8 in the open position.

FIGS. 8 and 9 illustrate the principles of the present invention embodied in the mixing valve in which dual parallel inlets are connected in the open position of the valve to a single enlarged outlet. Parallel inlet sockets 200, 201 are provided in a valve body 205. An outlet socket 207 is provided in the opposite side of the valve body. A plug 208 is provided with two end pressure distributing grooves 210 and 211 and with a central pressure distributing groove 212 which intersects the outlet port 215 in the valve body. The outlet port is substantially twice the area of each inlet port 217, 218 since it must accommodate the fluid from both inlet ports. Passages 220 and 221 are provided between each of the inlet sockets 200, 201 and the bore 223. The bore end of each passage aligns with a corresponding pressure distributing groove 210, 211.

Plug 208 is provided with a pair of slanted passages 225, 226 which, in the open position of the valve shown in FIG. 9, communicate at one end with the respective inlet ports 200, 201 and at their opposite ends merge into a common end 230 which communicates with outlet port 215. A pair of sinuous annular grooves 232, 233 are provided in the periphery of the plug and have O-rings 235, 236 seated therein. Each O-ring 235, 236 in the closed position of the valve shown in FIG. 8, is positioned between the associated inlet port 217, 218 and outlet port 215. The grooves and O-rings thus serve as flow sealing means to prevent leakage between a corresponding inlet port and the common outlet port. The O-rings follow paths that are substantially the same as that in the valve of FIGS. 1 to 5 so that diametrically opposite portions of the surface of plug 208 on both axial sides of each path are equal in area. The plug will thus be balanced as to fluid pressures tending either to shift it axially, laterally against the wall of the bore, or to tip it.

In the open position of the valve shown in FIG. 9 the O-rings 235, 236 are positioned with respect to their corresponding inlet ports 217, 218 and outlet port 215 substantially the same as in the valve of FIGS. 1 to 5.

Additional parts of the valve such as end O-ring seals 240, 241, wiper rings 243, 244, operating handle 250, storage compartment 252 and tapped hole 254 are also provided and are substantially the same as and perform substantially the same function as in the form of the invention shown in FIGS. 1 to 5 and will not, therefore, be discussed in detail.

Operation of the valve of FIGS. 8 and 9 is in all respects analogous to the operation of the form shown in FIGS. 1 to 5 with the exceptions inherent in the particular function of the mixing valve illustrated. Operation will, therefore, not be described in greater detail.

The principles of my invention are applicable also to valves having ports in addition to those in the valves specifically illustrated and described herein. For example, my invention is applicable to valves having three, four or more ports and which may also have other or special purposes and uses in addition to those mentioned herein.

While preferred and modified forms of my invention have been specifically illustrated and described herein, it will be apparent to those skilled in the art that modifications and improvements thereupon may be made and enjoyed without departing from the spirit and basic principle of my invention. Accordingly, it is my intention that my patent for my invention is not to be limited to the forms herein specifically disclosed, nor in any other way inconsistent with the progress in the art which has been promoted by my invention.

What is claimed is:

1. A rotary plug valve comprising a valve body having a bore with a lateral inlet port and a lateral outlet port communicating with said bore on opposite sides thereof, said outlet port being offset from said inlet port axially of said bore, a plug in said bore having a slanted passage, the ends of said passage registering and communicating with said inlet and outlet ports, respectively, in the open position of the valve, end sealing means between said bore and said plug between each opposite end of said plug and said inlet and outlet ports, respectively, flow sealing means between said bore and said plug, said flow sealing means following a continuous cyclical path around said plug having peaks which extend alternately in opposite axial directions, said flow sealing means defining with said end sealing means substantially equal surface areas of said plug at all diametrically opposite portions of said plug, said inlet and outlet ports lying on opposite sides of said flow sealing means in the closed position of the valve.

2. A valve according to claim 1 wherein said flow sealing means comprises an annular groove in said plug and an O-ring seated in said groove.

3. A valve according to claim 2 wherein said slanted passage in said plug lies entirely on one side of said path in both the open and closed positions of the valve.

4. A valve according to claim 2 wherein the circumferential length of said O-ring when unexpanded is less than the length of said cyclical path whereby said O-ring is retained in tension in said groove.

5. A valve according to claim 1 wherein said end sealing means includes an annular groove in said plug between each opposite end thereof and said inlet and outlet ports, respectively, and an O-ring seated in each said groove.

6. A valve according to claim 1 wherein the axes of said inlet and outlet ports are inclined with respect to the axis of said bore and are aligned with each other and with the axis of said slanted plug passage in the open position of the valve.

7. A valve according to claim 1 including an annular fluid distributing groove in said plug on the same side of said flow sealing means as said lateral inlet port in the closed position of the valve, said groove distributing fluid pressure completely around said plug on one side of said flow sealing means.

8. A valve according to claim 7 including a passage in said valve body from said bore adjacent said distributing groove to said inlet port for admitting fluid from said inlet port to said distributing groove.

9. A valve according to claim 1 wherein said plug and said bore are cylindrical and of substantially constant diameter through their axial length.

10. A valve according to claim 1 wherein a peak of said flow sealing means is positioned on one axial side of one of said ports in the closed position of the valve and an oppositely extending peak is positioned on the opposite axial side of said one port in the closed position of the valve.

11. A valve according to claim 10 wherein a peak of said flow sealing means is positioned on one axial side of said inlet port in the closed position of the valve and an axially oppositely extending peak is positioned on the opposite axial side of said inlet port in the open position of the valve.

12. A valve according to claim 10 wherein oppositely extending peaks of said flow sealing means are positioned on the same axial side of the other of said ports in the closed and open positions of the valve, respectively, whereby said flow sealing means is never passed over said other port.

13. A valve according to claim 12 wherein oppositely extending peaks of said flow sealing means are positioned on the same axial side of said outlet port in the closed and open positions, respectively, of said valve whereby said flow sealing means is never passed over said outlet port.

14. A valve according to claim 10 wherein said path comprises 2 repetitive sinuous cycles, each cycle including a pair of alternately extending peaks spaced 90° apart, one of said peaks of one cycle being positioned on one axial side of said inlet port in the open position of the valve and one on the other axial side of said inlet port in the closed postion of the valve, the peaks of said other cycle being positioned on the axial side of said outlet port corresponding to said one axial side of said inlet port in both the open and closed positions of the valve.

15. A valve according to claim 1 including a second lateral inlet port offset axially from said outlet port in the direction opposite said inlet port, said plug having a second slanted passage, the ends of said second passage registering and communicating with said second inlet port and said outlet port, respectively, in the open position of the valve, second flow sealing means between said bore and said plug, said second flow sealing means following a second continuous cyclical path having peaks which extend alternately in opposite axial directions, substantially identical increments of said second path being diametrically spaced apart, said second inlet port and said outlet port lying on opposite sides of said second flow sealing means in the closed position of the valve.

16. A rotary plug valve comprising a valve body having a cylindrical bore with a lateral inlet port and a lateral outlet port communicating with said bore, said inlet and outlet ports lying on opposite sides of said bore and having their axes in substantially the same axial plane and offset from each other axially of said bore, a cylindrical plug in said bore having a slanted passage, the ends of said passage registering and communicating with said inlet and outlet ports, respectively, when the valve is in the open position, end sealing means between said bore and said plug between each opposite end of said plug and said inlet port and outlet port, respectively, and flow sealing means between said bore and said plug, said flow sealing means following an axially alternating continuous cyclical path around said plug extending alternately on one and the other axial side of one of said inlet and outlet ports, said flow sealing means defining with each of said end sealing means equal surface areas of said plug on all diametrically opposite portions of said plug, said flow sealing means lying between said inlet port and said outlet port in the closed position of said valve.

17. A valve according to claim 16 wherein the path of said flow sealing means includes two repetitive cycles, each cycle having a pair of alternately extending peaks, one set of corresponding peaks in the two cycles extending on one axial side of one of said ports and the other set of corresponding peaks extending on the other axial side of said one of said ports.

18. A valve according to claim 17 wherein said corresponding peaks that extend in the same direction are positioned on the same axial sides of said inlet port and said outlet port, respectively, in the open position of the valve, and wherein one of said corresponding peaks that extend in the other direction is positioned on one side of said inlet port and the other on the opposite side of said outlet port in the closed position of the valve.

19. A valve according to claim 17 wherein the path of said flow sealing means is sinuous.

20. A valve according to claim 16 wherein said flow sealing means includes a groove in the outer surface of said plug and an O-ring seated in said groove.

21. A rotary plug valve comprising a valve body having a bore with a lateral inlet port and a lateral outlet port communicating with said bore on opposite sides thereof, said outlet port being offset from said inlet port axially of said bore, a plug in said bore having a slanted passage, the ends of said passage registering and communicating with said inlet and outlet ports, respectively, when the valve is in the open position, end sealing means between said bore and said plug between each opposite end of said plug and said inlet port and outlet port, respectively, flow sealing means including a groove in said plug and a sealing ring in said groove, said flow sealing means extending completely around said plug and defining with each of said end sealing means equal surface areas of said plug on all diametrically opposite portions of said plug, said flow sealing means following a path having peaks extending alternately in opposite axial directions such that in the closed position of the valve one of said ports and said passage are on one side of the path and the other of said ports is on the opposite side of the path and in the open position of the valve both of said ports and said passage are on the same side of the path.

* * * * *